United States Patent [19]

Eastwood

[11] 4,014,221
[45] Mar. 29, 1977

[54] TRANSFER BOX FOR FOUR-WHEEL DRIVE VEHICLES

[75] Inventor: Thomas Eastwood, Huddersfield, England

[73] Assignee: David Brown Tractors Limited, Huddersfield, England

[22] Filed: Oct. 28, 1975

[21] Appl. No.: 626,536

[30] Foreign Application Priority Data

Dec. 18, 1974 United Kingdom ............ 54584/74

[52] U.S. Cl. ............................ 74/665 GA; 74/343; 74/405

[51] Int. Cl.² .................. F16H 37/06; F16H 3/22; F16H 57/00

[58] Field of Search ............ 24/329, 333, 665 GA, 24/343, 405

[56] References Cited

UNITED STATES PATENTS

| | | |
|---|---|---|
| 2,415,758 | 2/1947 | Peterson et al. .................... 74/343 |
| 2,475,803 | 7/1949 | Probst ............................ 74/343 X |
| 2,487,735 | 11/1949 | Sherman et al. ................ 74/343 X |
| 2,946,238 | 7/1960 | Beyerstedt ....................... 74/333 X |
| 3,046,813 | 7/1962 | Bixby ............................ 74/665 GA |
| 3,221,574 | 12/1965 | Sampietro et al. ............ 74/665 GA |
| 3,752,014 | 8/1973 | Holtan ............................ 74/333 X |

Primary Examiner—Leonard Gerin
Attorney, Agent, or Firm—Norris & Bateman

[57] ABSTRACT

Transfer gearing for converting a vehicle with a single power-driven axle to four-wheel-drive is housed partially within the vehicle's gearbox. The transfer gearing comprises a train of gears on vertically spaced shafts, the lowermost shaft having a coupling flange adapted to be driveably connected by a cardan shaft to an auxiliary power-driven axle, and the uppermost shaft being disengageably connectible by clutch means to the output shaft of the vehicle's gearbox. The clutch means comprise a dog clutch sleeve slideable axially by a selector fork operated manually by means including an arm pivotally mounted externally upon the vehicle's gearbox.

6 Claims, 1 Drawing Figure

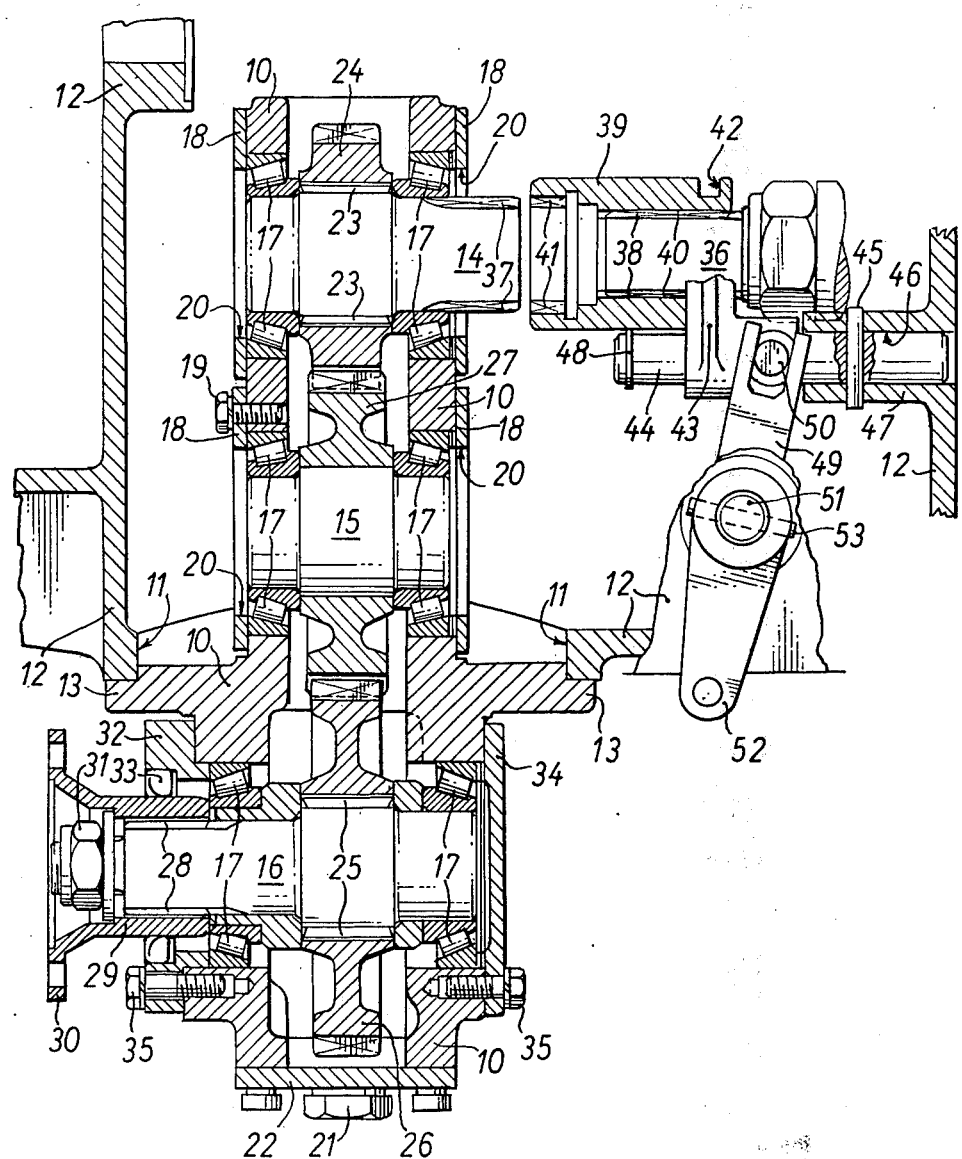

TRANSFER BOX FOR FOUR-WHEEL DRIVE VEHICLES

BACKGROUND OF THE INVENTION

The invention relates to gearing, and more particularly to transfer gearing for converting a vehicle with a single power-driven axle to four-wheel-drive.

Hitherto, such transfer gearing has included a shaft permanently driveably connected by a muff coupling or the like to the output shaft of the vehicle's gearbox, which has made it extremely difficult to instal and remove said gearing; and a clutch at the output end of said gearing.

The object of the present invention is to facilitate the installation and removal of transfer gearing.

SUMMARY OF INVENTION

According to the invention, gearing for converting a vehicle with a single power-driven axle to four-wheel-drive comprises a casing adapted to be partially inserted through an aperture in the vehicle's gearbox, a plurality of gears rotatable within the casing about respective vertically spaced axes, the uppermost and lowermost of said gears being rigidly secured on or integral with respective uppermost and lowermost shafts journalled in the casing, an output coupling flange rigidly secured to the lowermost shaft outside the coupling flange rigidly secured to the lowermost shaft outside the vehicle's gearbox, and clutch means adapted to disengageably connect the uppermost shaft to the output shaft of the vehicle's gearbox.

BRIEF DESCRIPTION OF DRAWINGS

A preferred embodiment of the invention will now be described, by way of example, with reference to the accompanying drawing which is a sectional side elevation of transfer gearing for converting a conventional agricultural tractor to four-wheel-drive.

DESCRIPTION OF PREFERRED EMBODIMENT

A conventional agricultural tractor with a power-driven rear axle is converted to four-wheel-drive by replacing its conventional front axle with an auxiliary power-driven axle, installing transfer gearing disengeably driveable from the output shaft of the tractor's gearbox, and driveably connecting the auxiliary axle to the transfer gearing by means of a cardan shaft. Referring now to the drawing, the transfer gearing includes a casing 10 adapted to be partially inserted through a downwardly having housing aperture 11 in the underside of the tractor's gearbox 12, and provided with a flange 13 which abuts against the rim of the aperture 11 to limit the extent to which the casing 10 is inserted into the gearbox 12 and which is connectible to said rim by set-screws (not shown). Three vertically spaced shafts 14, 15 and 16 arranged to extend parallel to one another and longitudinally of the tractor are each journalled in a pair of tapered roller bearings 17 in the casing 10, and the uppermost shaft 14 and the middle shaft 15 have associated bearing retainers 18 which are secured to the casing 10 by set-screws such as 19 and which have large central openings 20 to enable lubricating oil within the tractor's gearbox 12 to enter the casing 10 freely. A drain plug 21 is provided in a cover 22 for the bottom of the casing 10. The uppermost shaft 14 is provided with an externally splined zone 23 between its bearings 17, and an internally splined gear 24 is rigidly secured on said zone. Similarly, the lowermost shaft 16 has an externally splined zone 25 between its bearings 17, and an internally splined gear 26 is rigidly secured on said zone. Another gear 27 is rigidly secured on the middle shaft 15, between the bearings 17 thereof, by pressing it onto said shaft, and said other gear 27 meshes constantly with each of the gears 24 and 26 to form the idler of a three-gear train. The front end of the lowermost shaft 16 projects from the casing 10 below the underside of the tractor's gearbox 12 and is provided with external splines 28 on which an internally splined hub 29 with an integral coupling flange 30 adapted to be driveably connected to the cardan shaft (not shown) leading to the front drive axle is rigidly secured by means of a nut 31. A retainer 32 for the front bearing 17 of the lowermost shaft houses an oil seal 33 which rubs against the periphery of the hub 29, and the bearing 17 of said shaft has a retainer 34 consisting of an oil-tight plate. Both of the bearing retainers 32 and 34 are secure to the casing 10 by set-screws such as 35. The rear end of the uppermost shaft 14 is co-axially alinged with the front end of the output shaft 36 of the tractor's gearbox 12, and said end of the uppermost shaft 14 is provided with external dog clutch teeth 37 whilst said end of said output shaft 36 is provided with external splines 38. The other or rear end of said gearbox output shaft remains drive connected in the conventional manner to the rear drive axle. A clutch sleeve 39 provided with internal splines 40 is slideable axially on the splines 38 on said output shaft 36 between the disengaged position shown in the drawing in which it is clear of the uppermost shaft 14 and an engaged position in which internal dog clutch teeth 41 formed in the front end of the sleeve 39 engage driveably with the clutch teeth 37 on the upermost shaft 14. The sleeve 39 has a peripheral groove 42 in which there engages a selector fork 43 slideable along a dead shaft 44 rigidly secured by means of a diametrical pin 45 in a bore 46 formed in a boss 47 disposed within the tractor's gearbox 12. The selector fork 43 houses a spring-loaded ball (not shown) adapted to engage in well known manner either of two axially spaced dimples (not shown) in the dead shaft 44 which define the engaged and disengaged positions of the selector fork 43 and thus of the clutch sleeve 39, but the free front end of the dead shaft 44 is also provided with a circlip 48 to ensure that the selector fork 43 cannot be forced excessively to overrun the "engaged" dimple. The selector fork 43 is actuated by an arm 49 having a forked end engaging a pin 50 formed on the selector fork, said arm being welded to the inner end of a spindle 51 which extends laterally of the tractor through a bore in the side wall of its gearbox 12. Said bore houses an oil seal (not shown), and the spindle 51 is pivotable by means of an arm 52 rigidly secured to its outer end by a diametrical pin 53 and manually operable by way of a linkage (not shown).

In operation, when the clutch sleeve 39 is in its engaged position all four wheels of the tractor are power driven, the rotational speeds of the front and rear axles being correctly interrelated, having regard to the relative diameters of the front and rear wheels, whatever speed ratio is engaged in the tractor's gearbox 12, due to the drive for the front axle being taken from the output shaft 36 of said gearbox. When the clutch sleeve 39 is in its disengaged position, no drive is transmitted to the front axle. Installation of the transfer gearing can readily be effected with the sleeve 39 in this position simply by inserting said gearing through the aperture 11 (without any of the difficulty hitherto experienced in connecting the uppermost shaft by a muff coupling or the like to the output shaft of the tractor's gearbox), inserting the set-screws connecting the casing 10 to the rim of the aperture 11, and connecting the coupling flange 30 to the cardan shaft; removal of the transfer gearing being equally readily effected simply by reversing this sequence of operations whilst the clutch sleeve 39 occupies its disengaged position. The arrangement has the further advantage that the external arm 52 and linkage which actuate the clutch for the transfer gearing are at a higher level than hitherto and thus less liable to damage during field operations.

In a modification, the gears 24, 26 and 27 are integral with their respective shafts, in which event the casing 10 has to be split vertically to permit assembly. In another modification, the number of gears in the casing can be varied. In a further modification, the or each idler gear can be journalled on a dead shaft fixed to the casing.

I claim:

1. Transfer gearing for converting a vehicle with a single power-driven axle to four-wheel drive adapted for mounting upon and operative connection to a power actuated vehicle gearbox assembly that has a driven output shaft drive connected to one vehicle drive axle, said gearbox assembly comprising a housing having an aperture through which an end of said output shaft within the housing is accessible, and said transfer gearing comprising a casing adapted to be partially inserted through said aperture and having means whereby it may be secured to said gearbox housing in a partially inserted position, a gear train comprising a plurality of gears rotatably mounted within said casing on vertically spaced axes, the uppermost and lowermost of said gears being non-rotatably mounted on shafts rotatably supported in said casing, with the uppermost gear being located within the gearbox assembly housing and the lowermost gear being located externally of the gearbox assembly housing upon securing the partially inserted casing on the gearbox assembly, means on the shaft carrying said lowermost gear for coupling to another drive axle on the vehicle, and cooperating clutch means on said shaft carrying the uppermost gear and said end of the output shaft within the gearbox housing for selectively drive connecting said gear train to said output shaft for driving said other drive axle.

2. Transfer gearing as defined in claim 1, wherein said aperture is in the bottom of the gearbox housing, and said means for securing said casing to the gearbox assembly is such that said uppermost shaft is located in axial alignment with and adjacent the end of said output shaft within said gearbox assembly.

3. Transfer gearing as defined in claim 1, wherein said casing is mounted upon the gearbox housing by means extending over said aperture, and at least one opening is provided in the part of said casing within the gearbox housing whereby lubricant from the gearbox may enter said casing to lubricate said gear train during operation.

4. Transfer gearing as defined in claim 1, wherein there are three gears in said train which consists essentially of a rotatable idler gear meshed with both the uppermost and lowermost gears.

5. Transfer gearing as defined in claim 1, wherein said cutch means comprises a sleeve slidable axially on splines on said output shaft and having internal dog teeth, external dog clutch teeth on the adjacent end of said uppermost shaft, and a selector fork connected for moving said sleeve between clutch tooth disengaged position and a clutch tooth engaged position.

6. Transfer gearing as defined in claim 5, wherein said selector fork is moved between said position by a lever mechanism pivoted upon the gearbox housing and having external actuating means.

* * * * *